May 18, 1954
C. G. ROPER ET AL
2,678,661
VALVE
Filed March 23, 1949
2 Sheets-Sheet 1
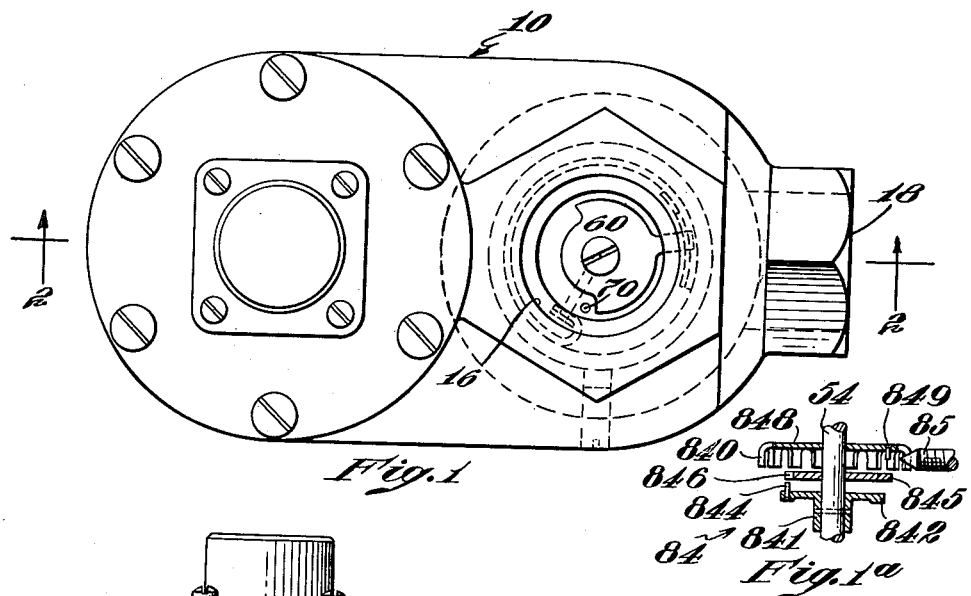
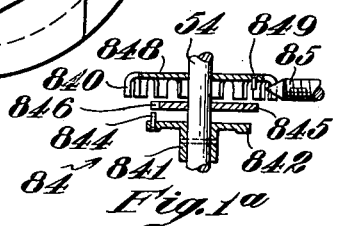
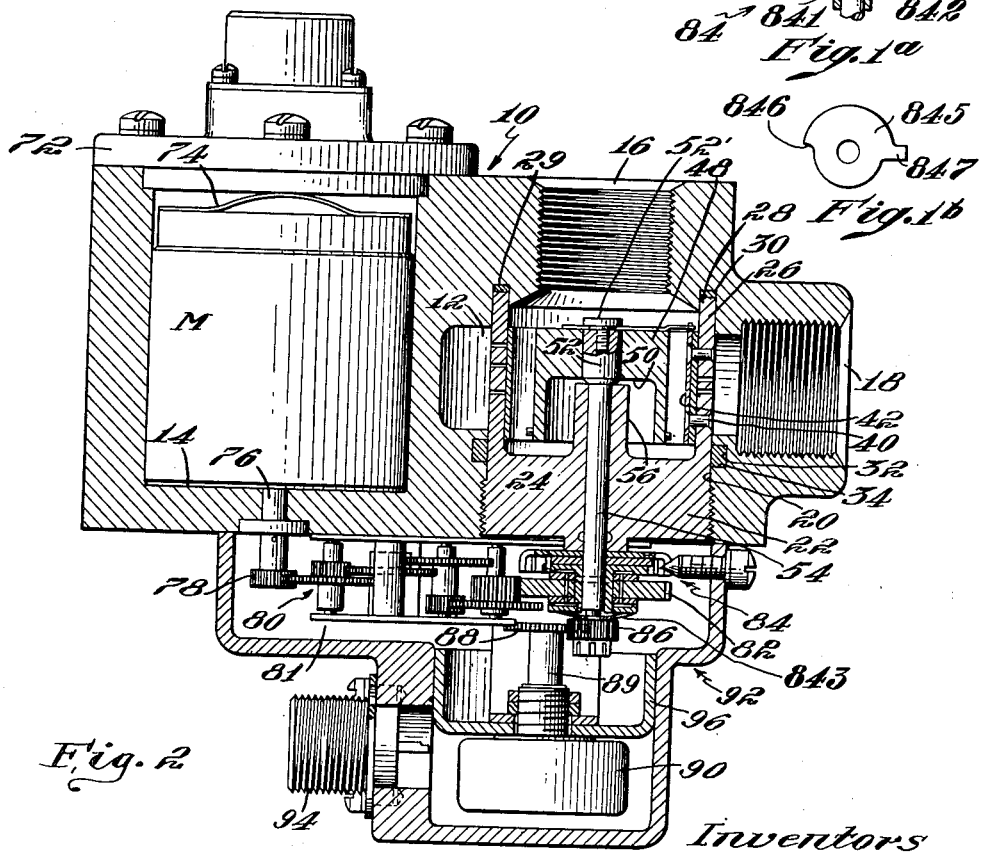
Inventors
Charles G. Roper
Wilbur N. Roberts
by Roberts, Cushman & Grover
Att'ys.

May 18, 1954  C. G. ROPER ET AL  2,678,661
VALVE

Filed March 23, 1949 2 Sheets-Sheet 2

Inventors
Charles G. Roper
Wilbur N. Roberts
by Roberts, Cushman & Grover
Att'ys.

Patented May 18, 1954

2,678,661

UNITED STATES PATENT OFFICE 2,678,661

VALVE

Charles G. Roper and Wilbur N. Roberts, Fairfield, Conn., assignors to Manning, Maxwell & Moore, Incorporated, New York, N. Y., a corporation of New Jersey Application March 23, 1949, Serial No. 82,947

5 Claims. (Cl. 137—625.28)

This invention relates to valves and in particular to an improved flow valve for use in fuel feeding.

The principal objects of the invention are to provide a fuel valve which will effectively handle a large volume of fuel, which will have a wide range of flow characteristics and which may be operated from the low power delivered by electronic circuits. Other objects are to provide a valve wherein leakage around the valve seat and valve is minimized, wherein the operating parts may easily be replaced, and wherein the danger of explosion is minimized. Additional objects are to provide a power-operated valve, in which damage to the operating parts is minimized in the event of sticking or jamming, wherein there is means for tracking the position of the valve at any given time and its rate of opening and closing, which will withstand high operating pressure and have a large temperature range as well as the solvent action of the fuel and which will require no more than ordinary good machining in its manufacture. Still further objects of the invention are to provide a valve which is compact, wear-resistant and will be especially suitable for remote control of fuel flow in a fuel distribution system.

In accordance with the foregoing objects the valve has a valve chamber with which communicate inlet and outlet openings and in which there is seated a rigid cylindrical valve seat through which liquid must pass to flow from the inlet to the outlet. The cylindrical valve seat has an orifice therein and a flexible valve strip covering the orifice, one end of the strip being anchored to the seat and the other being attached to means operable to bend the strip back upon itself to peel it away from the orifice. The operating means is in the form of a rotor situated within the valve seat to which the opposite end of the strip is attached and which has a valve stem projecting from the valve drivably connected by a gear train to the shaft of a motor housed within another part of the valve. To prevent damage to the valve parts by jamming thereof a slip clutch is included within the gear train.

The rate of opening and closing of the valve and also the minimum and maximum positions of the valve are electrically indicated for the purpose of control by a potentiometer also included in the gear train. Preferably the valve openings in the valve seat are arranged so that the area of the opening varies linearly or logarithmically as the strip is bent back therefrom.

The valve strip is a flat flexible strip of buna derivative rubber of substantially 0.050 inch thickness, and maintains its flexibility over a temperature range of from −65° F. to +165° F. To improve its strength it may have one or more fiber inserts.

It is also contemplated that the valve seat, valve strip and operating parts be removable as a unit from the valve body to facilitate repair and replacement thereof by a unit having different flow characteristics. Accordingly the valve seat is removably inserted in the valve chamber through a wall of the valve body, being threadably engaged therewith and is constructed to constitute the entire support for the valve strip and operating means. As illustrated the valve seat includes a threaded plug for engagement with the opening opposite the inlet opening from which there extends a cylindrical valve seat portion, the rim of which is concentric with the inlet and has sealed engagement with the wall bordering the inlet. A boss projects inwardly from the plug into the cylindrical portion of the valve seat and has in it an opening for reception of the valve rod to which is attached the rotor.

The invention will now be described in greater detail with reference to the accompanying drawings wherein:

Fig. 1 is a top plan view of the valve body;

Fig. 1a is an exploded view of a detail of a slip clutch and adjustable limit means;

Fig. 1b is a plan view of a part of the limit means of the clutch;

Fig. 2 is a vertical elevation partly in section on the line 2—2 of Fig. 1;

Figure 5:
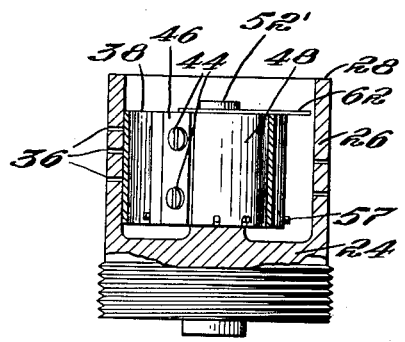
Fig. 5 is a vertical elevation of the valve kit, partly in section.
Figure 4:
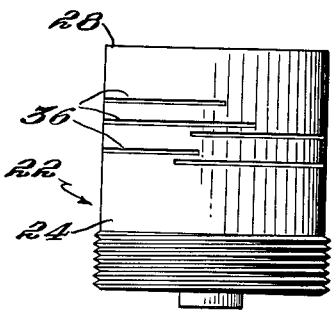
Fig. 4 is a vertical elevation of the valve sub-assembly or kit.

Referring to the drawings the valve is shown as comprising a valve body 10 having spaced valve and motor chambers 12 and 14 situated therein with their axes substantially parallel. The valve chamber 12 has an inlet opening 16 and an outlet opening 18, both of which are threaded for the reception of conduits to and from the valve body. There is also in the valve body a threaded opening 20 which opens into the valve chamber substantially opposite the inlet 16 for the reception of a subassembly or valve kit (Figs. 4 and 5), the valve kit being threadably engaged with the opening 20 so as to be readily removable therefrom to permit replacement thereof by other kits having different flow characteristics. The valve kit 22 comprises a plug 24 having a threaded portion for engagement with the threaded aperture 20 and a cylindrical valve seat portion 26 which extends therefrom across the chamber 12 into engagement with the wall bordering the inlet 16. The rim 28 of the portion 26 is engaged within a groove 30 formed in the wall of the chamber bordering the inlet 16 and a packing ring 29 is interposed between the rim and the groove. A groove 32 is also formed in the valve body in the wall of the opening 20 near the entrance thereof into the chamber in which there is disposed a packing ring 34. The packing rings 29 and 34 prevent leakage of the fluid between the valve seat and valve body and stop leakage around the valve shaft which delivers torque from the gear train to the rotor as will appear hereinafter.

The cylindrical valve portion 26 has in its peripheral wall a plurality of valve orifices (Figs. 4 and 5) which as shown are in the form of long narrow slots 36 although it is to be understood that any desired shape of valve orifice may be provided in lieu of these shown in accordance with the desired characteristics of flow which are to be attained. Preferably either slots or holes may be used in the planar development of the cylindrical seat arranged so that the orifice area will vary linearly or logarithmically with the uncovering or covering thereof.

Figure 6:
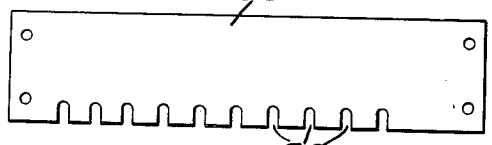
Fig. 6 is a plan view of the valve strip.
Figure 3:
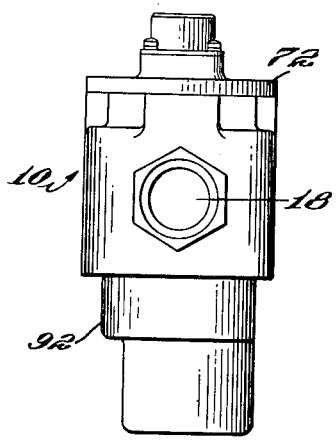
Fig. 3 is a vertical end elevation looking from the right-hand side of Fig. 2.

Within the cylindrical valve seat portion there is a thin, flat, flexible valve strip 38 (Fig. 6) placed in a position to overlie the inner wall of the valve seat and the orifices 36 therein. One end of this valve strip is fastened by means of rivets or other suitable means 40 to a portion of the cylindrical wall of the valve seat, there being an overlying anchoring plate 42 to assist in holding the valve strip flat. The opposite end of the valve strip is anchored by means of screws 44 or the like and an anchor plate 46 to a portion of the surface of a rotor 48 situated within the valve seat.

One of the most important problems in designing the present valve was in the selection of a suitable material for the valve strip 38. It was necessary that it be unaffected by aromatics in aircraft gasoline; that it hold its shape and not be forced into the valve slots; and that it maintain its flexibility and strength over a temperature range from −65° F. to +165° F.; and that it operate under pressures as high as 600 pounds per square inch. Various kinds of synthetic materials were tried and tested with respect to swelling, checking, rupture or permanent set under high pressures with different size orifices, and also as to flexibility. It was found that a sheet material comprised of buna derivative rubber of a thickness of 0.05 inch was the preferred material to use. To increase its strength and hence to prevent stretching it was found desirable to insert one or more layers of woven plastic fiber.

The rotor 48 is fixed on the upper end 52 (Fig. 2) of a valve spindle or shaft 54 which passes through the plug and through a boss 56 formed thereon which projects upwardly therefrom into the valve seat portion, there being a bearing opening through the plug and boss for rotatably receiving the shaft. The under side of the rotor is recessed at 50 to accommodate the upwardly projecting boss 56.

Figure 7:
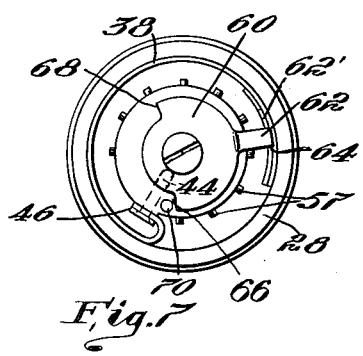
Fig. 7 is a top plan view of the valve kit showing the valve member in a closed position.
Figure 8:
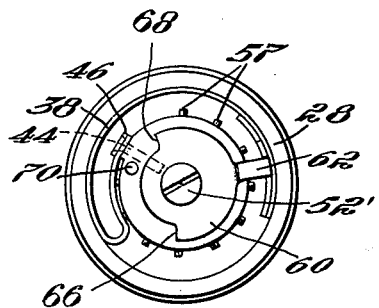
Fig. 8 is a view corresponding to Fig. 7 with the valve partially opened.

By rotation of the rotor 48 the flat valve strip 38 may be peeled back from a position covering the valve orifices (Fig. 7) to a position wherein they are partially or wholly uncovered, an intermediate position of uncovering being shown in Fig. 8. The shape of the orifices 36 in the valve seat as heretofore related are selected so that as the rotor is rotated to cover or uncover the orifices, the area will vary linearly or logarithmically or in any other suitable characteristic with the angular rotation of the rotor.

Figure 9:
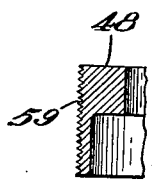
Fig. 9 shows a fragmentary portion of the rotor with its external surface knurled.

One of the difficulties encountered with this type of valve strip was the tendency of the strip to double up twice on itself when running without any fuel flowing through the valve and hence with no fluid pressure against the strip. In closing the valve when the rotor was moving at a high speed, the strip would tend to slip off the rotor, stick against itself, and form an extra fold, jamming four layers of the strip into the space between the rotor and seat and causing the valve to stick. Some method of continuously taking up the slack in the strip was necessary and a very simple measure provides for this satisfactorily. To wit, the rotor on which the strip is rolled up is provided along one peripheral edge with a plurality of uniformly spaced pins 57 (Figs. 7 and 8). Along a corresponding edge of a valve strip 38 (Fig. 6) there are formed a similar number of spaced slots 58 for cooperation with the aforesaid pins 57. It is to be understood that there may be pins 57 at both edges of the rotor and corresponding notches at both edges of the valve strip. This provides a positive drive between the rotor and the strip in either direction of rotation thereof so as to guide the strip and prevent it from doubling back upon itself. Alternatively, as shown in Fig. 9, the surface of the rotor may be provided with knurling 59, the friction afforded thereby being sufficient to keep the strip from slipping on the rotor when it is rotating in one direction or the other.

It is desirable to limit the open and closed positions of the valve and also to provide means for governing the degree of opening or closing. The former is accomplished by provision of a stop plate 60 (Figs. 7 and 8) mounted for free rotation on the head 52 of the shaft 54, being fastened thereto by a screw 52'. An arm 62 extends radially therefrom for engagement with a stop lug 62' carried by the anchor plate 42. At equal distances from the arm are symmetrically spaced radially extending shoulders 66 and 68. A pin 70 is set into the upper end of the rotor in a position to be engaged by the shoulder 66 or 68. In operation when the rotor begins to turn from the closed position of the valve shown in Fig. 7 the pin 70 will travel with the rotor clockwise until it strikes the shoulder, whereupon the plate 60 will begin to turn and rotation of the rotor and plate will continue until the arm 62 is brought up against the lug 62'. The limit for the maximum and minimum flow is provided for by the slip clutch 84 as follows. A hub 841 is pinned to the shaft 54 and has at one end a clutch disk 842 the inner face of which is engaged by a friction ring fastened to the gear 82, the engagement of the friction ring and disk being effected by a spring disk 843 interposed between the opposite face of the gear 82 and the gear 86. The disk 842 has fixed on its outer face near its edge a pin 844. A freely rotatable plate 845 is mounted on the shaft outwardly of the disk 842 and has at its periphery a shoulder 846 and a lug 847. Also loosely mounted on the shaft is a spider 848 having a peripheral flange in which are a plurality of equally spaced openings 840. A pin 849 is fixed to the inner face of the spider in a position to be engaged by the lug 847 on the plate 845. A screw 85 is threaded through the housing 92 in a position to be entered into a selected one of the openings 848 so as to fix the position of the spider and hence the pin 849. Accordingly when the gear 82 is driven to turn the shaft 54 by way of the clutch, the disk 842 will turn, its pin 844 will engage the shoulder 846 and the plate 845 will then turn on the shaft until the lug 847 is brought up against the pin 849, whereupon further rotation of the shaft will be restrained and the clutch will slip. By the aforesaid construction it is apparent that the degree of rotation of the shaft 54 may be limited in either direction by adjustment of the position of the spider 848.

One of the major advantages of the foregoing construction and manufacture thereof is that only ordinary good machining is required. No grinding or lapping of the seat is necessary. Fuel pressure on the valve strip causes complete sealing, and because of the large seating area, wear is minimized. In addition, there are no close tolerances in alignment of the parts since the flexible valve strip seats itself. Problems of varying unbalanced loads are eliminated, and there is no tendency to chatter at low flows as is a balanced poppet valve. These features permit better production tolerances and eliminate assembly adjustments and calibrations.

The rotor is driven by rotation of the shaft 54 and this is accomplished by means of a small motor M situated in the motor chamber 14. The motor is held within the chamber by an overlying cap bolted to the valve body and a spring 74 interposed between the top of the motor and the cap to prevent movement of the motor therein. It is to be observed that the wall between the chambers 14 and 12 is thick so as to be flame- and explosion-proof. The motor shaft 76 projects through the bottom of the motor chamber parallel to the valve shaft 54 and has thereon a gear 78. With the motor shaft and valve shaft parallel, the distance between them allows maximum flexibility in gearing and speed of valve operation. The motor shaft is drivably connected to the valve shaft by a train of gears indicated generally at 80 (Fig. 2) interposed between the gear 78 and a gear 82 mounted for free rotation on the outer end of the valve shaft 54. The gear 82 is connected to a slip clutch 84 on the shaft 54 and hence drive from the motor is by way of the slip clutch 84. The slip clutch is spring loaded so that it will transmit sufficient torque to rotate the valve shaft. Hence when the valve reaches its closed or open position at the end of its travel or if, for any reason the valve parts become jammed the clutch slips, allowing the gear train to over-travel and come to a stop gradually.

Although not necessary to the valve operation, a potentiometer 90 is geared to the valve shaft 54 by way of the gears 86 and 88, the latter being fixed to the shaft 89 of the potentiometer to provide a resistance indication of the valve position. This is particularly useful in designing a proportional control system where a specific valve position is required for every value of a control signal. A housing 92 fastened to the under side of the valve body 10 encloses the gear train and has in it a separate chamber divided therefrom by an explosion-proof wall 96 in which is situated the potentiometer. A connector 94 provides for entrance of electric connectors to the potentiometer within its chamber.

The valve body, which houses both the valve and the motor, is hogged out of aluminum bar stock. Completely machining the body out of solid aluminum was done for a number of reasons. The foremost of these was the lack of confidence in the pressure tightness of aluminum die casting under high fuel pressures. In machining the body very few dimensions are critical. Close tolerances are required only in concentricity of the motor pocket and motor shaft hole, valve shaft diameter and its bearing diameter, and in dimensions for the ring seal grooves. After machining, the body is first annodized and then, after a zinc-chromate primer coat, is finished by baking enamel thereon.

The valve seat is machined from stainless steel as is the rotor, while the valve shaft, which must run in the bearing surface provided by the valve boss 56 and plug 24, is fabricated from Monel metal. All brass parts, with the exception of the gears themselves, are nickel plated. Gears in the gear train are staked onto knurled shafts while the clutch mechanism is pinned to the valve shaft.

The gear train is provided with brass end plates and hardened steel shafts. This proved satisfactory for non-galling operations and to improve the life of the shafts, bearings made of oil impregnated porous powdered metals are press fitted into the end plates.

Reference being had to the diagrammatic layout (Fig. 10) of the electrical system, the electric part of the design consists of a fractional horsepower motor M to drive the valve shaft through the aforesaid gear train 80. The motor is a ten-watt, squirrel-cage servo type having two separate 50-volt windings 98 and 100, the former continuously excited and the latter controlled to vary the speed and direction of rotation. When the control winding voltage is shifted in phase by 180 degrees, the motor reverses; and its speed at any time assuming a constant excitation voltage, is approximately proportional to the magnitude of the control voltage.

Figure 10:
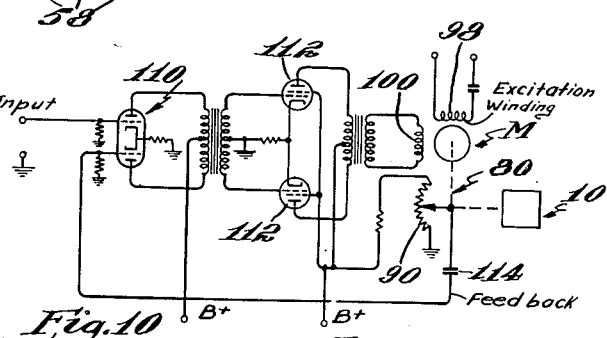
Fig. 10 is a diagrammatic layout of the electrical system.

Because of the small amount of power needed to position the valve, the motor can be controlled by any electronic amplifier using miniature tubes. The motor control section of the amplifier circuit is shown in Fig. 10. The twin triode 110 is used in converting a D.-C. control signal into an A.-C. signal to drive the motor. When the input grid is positive, the motor runs in one direction; when it is negative, the motor runs in the opposite direction. The power output stage consists of two tubes 112 in a push-pull circuit.

Using a twin tube in the input stage serves two purposes. It keeps the stage balanced with respect to line voltage variations, and it provides a place for the introduction of a speed signal for the valve. The valve and potentiometer are both geared to the motor, as heretofore related. The D.-C. voltage between the moving arm of the potentiometer and ground is fed through a condenser 114 to the grid of the second half of the tube 110. As long as the valve is not moving, no signal passes the condenser. When the valve moves, the D.-C. potential at the moving arm changes and current is transmitted through the condenser 114 which is proportional to the rate of change of potentiometer voltage and, therefore, to the rate of change of the valve position. Accordingly, across the grid resistor a voltage is developed which is proportional to valve speed. This is very important from a control point of view, in that the degenerative speed feed-back signal is effective in stabilizing the control system.

Although the circuit shown has performed well, magnetic amplifiers may be used in lieu thereof and may be desirable since electronic tubes, even when under-rated, have poor life characteristics compared to saturable reactors.

Many uses have been made of the valve. The simplest application is in remote control of fuel flow. The position of a manual or pressure-operated potentiometer at one location in an airplane is compared by a sensitive amplifier with the position of the potentiometer 90 on the valve 10. The amplifier provides a signal which causes the motor to drive the potentiometer 90 on the valve to a position corresponding to the control potentiometer and, accordingly, the fuel flow is determined by the control potentiometer position.

In turbo-jet engine controls, the valve 10 is used to control maximum gas temperature by varying fuel flow to the engine. The output of the thermocouple in the gas stream is compared with a standard voltage. When the temperature signal falls below the standard, the fuel flow is increased; when it exceeds the standard, the fuel flow is decreased. The motor-controlled valve is especially effective in such an application since temperature measurements usually involve some form of electronic amplifier with limited output power.

For any automatic control system in which it is important that speed of operation be proportional to the error signal for stable control, the motor-operated control valve is exceptionally well suited. Non-linealities in control system requirements can easily be met with irregular valve ports and only low power is required for valve actuation.

It should be understood that the present disclosure is for the purpose of illustration only and that this invention includes all modifications and equivalents which fall within the scope of the appended claims.

We claim:

1. A valve comprising a valve body having a valve chamber therein and inlet and outlet openings in communication therewith, a rigid cylindrical valve seat removably screwed into the wall of the body in a position situated between the inlet and outlet, packing interposed between the valve seat and the inner wall of the chamber sealing the seat so that flow can take place only through the valve seat, said valve seat having an orifice therein, a flat valve strip overlying the orifice and means operable to peel the valve strip away from the orifice.

2. A valve comprising a valve body having a valve chamber therein and inlet and outlet openings in communication therewith, a rigid valve seat situated in the valve chamber between the inlet and outlet openings, said valve seat having an orifice therein, a valve strip overlying the orifice in the valve seat, and a rotor operable to peel the valve strip away from the valve orifice, said rotor having peripherally spaced pins and said strip having equally spaced openings therein cooperable with the pins to afford a positive drive between the rotor and strip.

3. A valve comprising a valve body having a valve chamber and inlet and outlet openings in communication therewith, a rigid cylindrical valve seat situated in the valve chamber between the inlet and outlet openings, said valve seat having an opening therein, a valve strip covering the opening in the valve seat, a rotor operable to peel the valve strip away from the opening in the valve seat, and peripherally spaced pins on the rotor adjacent an edge, said strip having equally spaced slots along a corresponding edge for engagement with the pins to afford a positive drive between the rotor and the strip.

4. A valve comprising a valve body having a valve chamber therein and inlet and outlet openings, said chamber having a cylindrical opening in one wall, opposite which in the opposite wall is an annular groove, a valve seat member threaded into the cylindrical opening having a cylindrical wall constituting a valve seat extending therefrom to the opposite wall where its rim engages said annular groove, a valve strip in contact with the valve seat and means for moving the strip relative to the seat to separate it from said valve seat, said valve seat member affording the entire support for the valve strip and means for operating the same.

5. A valve comprising a valve body having a valve chamber therein and inlet and outlet openings communicating therewith, said chamber having a cylindrical opening in one wall concentric with the inlet, said opposite wall having an annular groove surrounding the inlet, a valve seat member including a threaded plug for threaded engagement with the cylindrical opening, a cylindrical seat portion extending from the plug for engagement of its rim within the groove and valve orifices in its cylindrical portion, a boss integral with the plug extending into the cylindrical portion for receiving a shaft, a valve operating shaft means passing through the plug and the boss to the interior of the cylindrical portion, a rotor carried by the shaft and a valve strip at the inside of the cylindrical portion overlying the orifices, said strip being anchored to both the seat and the rotor, whereby rotation of the rotor pulls the strip away from the orifices, removal of said plug effecting removal of the valve seat, valve and valve operating shaft means as a unit.

References Cited in the file of this patent

UNITED STATES PATENTS

| Number | Name | Date |
| --- | --- | --- |
| 19,203 | Osgood | Jan. 26, 1858 |
| 70,511 | Bourden | Nov. 5, 1867 |
| 665,133 | Riggs | Jan. 1, 1901 |
| 865,556 | Andersen | Sept. 10, 1907 |
| 1,039,059 | Howard | Sept. 17, 1912 |
| 1,138,994 | Steele | May 11, 1915 |
| 1,730,601 | Brown | Oct. 8, 1929 |
| 1,739,864 | Schardein | Dec. 17, 1929 |
| 1,787,304 | Becker | Dec. 30, 1930 |
| 1,908,763 | Kelty | May 16, 1933 |
| 2,216,000 | Crawford | Sept. 24, 1940 |
| 2,393,482 | Smith | Jan. 22, 1946 |

FOREIGN PATENTS

| Number | Country | Date |
| --- | --- | --- |
| 14,177 | Norway | 1904 |
| 132,216 | Austria | 1932 |
| 778,554 | France | Dec. 22, 1934 |
| 536,543 | Great Britain | 1941 |